United States Patent [19]

Bloom et al.

[11] 4,355,352
[45] * Oct. 19, 1982

[54] DC TO DC CONVERTER

[76] Inventors: Gordon E. Bloom, 617 Hampshire Rd., West Lake Village, Calif. 91361; Altan Eris, 30440 Sandtrap Dr., Agoura, Calif. 91301

[*] Notice: The portion of the term of this patent subsequent to Apr. 14, 1998, has been disclaimed.

[21] Appl. No.: 153,250

[22] Filed: May 27, 1980

Related U.S. Application Data

[63] Continuation-in-part of Ser. No. 63,226, Aug. 3, 1979, Pat. No. 4,262,328.

[51] Int. Cl.³ .......................................... H02M 3/335
[52] U.S. Cl. ........................................ 363/16; 363/39
[58] Field of Search ........................ 363/15, 16, 20, 21, 363/39, 40, 124, 131; 307/98, 105

[56] References Cited

U.S. PATENT DOCUMENTS

| | | | |
|---|---|---|---|
| 4,184,197 | 1/1980 | Cuk et al. | 363/16 |
| 4,186,437 | 1/1980 | Cuk | 363/16 |
| 4,257,087 | 3/1981 | Cuk | 363/16 |
| 4,262,328 | 4/1981 | Bloom et al. | 363/16 |

Primary Examiner—William M. Shoop
Assistant Examiner—Peter S. Wong

[57] ABSTRACT

A DC to DC converter is shown using three coupled inductor windings, two capacitors and two switching devices to provide a ripple free input and output current.

3 Claims, 3 Drawing Figures

DC TO DC CONVERTER

CROSS-REFERENCE TO RELATED APPLICATION

This application is a continuation-in-part of our previously-filed, copending patent application Ser. No. 63,226, filed Aug. 3, 1979, entitled DC-to-DC Converter, now U.S. Pat. No. 4,262,328, issued Apr. 14, 1981.

FIELD OF THE INVENTION

This invention pertains to an improved DC to DC converter and, more particularly, to an optimum topology converter which is adapted to increase or decrease a DC voltage without producing ripple currents in either the input or output connections to the circuit.

BACKGROUND OF THE INVENTION

The DC to DC converter of this invention is an improvement over our copending patent application mentioned above in that the same ripple free currents in both input and output connections are achieved using but three coupled inductor windings and associated inductance tuning in place of the four coupled inductors used in our copending patent application.

Our copending patent application was developed from the theories expressed in our paper entitled "Practical Design Considerations For A Multi-Output Optimum Topology Converter" by Gordon E. Bloom and Altan Eris, published in *IEEE International Power Specialists Conference* (IPSC) presented in San Diego, California, June, 1979; and republication in *European Power Convention '79* presented in Munich, West Germany, Sept. 17–21, 1979.

In turn, the apparatus of our copending patent application, from which this invention is a continuation-in-part, is an improvement over the circuits conceived by Slobodan Cuk, et al., as described, for example, in *Electronic Design News,* May 20, 1979, on pages 54, et. seq.

A still further description of the prior art may be found in "Coupled-Inductor and Other Extensions of a New Optimum Topology Switching DC-to-DC Converter" by Slobodan Cuk and R.D. Middlebrook in *IAS 77 Annual,* pages 1110, et seq.

The authors of those papers refer to U.S. Pat. application Ser. No. 837,532, filed Sept. 26, 1977, the subject matter of which is unknown to the inventors of this invention. That patent application issued Jan. 15, 1981 as U.S. Pat. No. 4,184,197.

Cuk, et al., have described a circuit which either produces a zero rippled output current or a zero ripple input current, but not both. See "Switching DC-to-DC Converter with Zero Input or Output Current Ripple" by Slobodan Cuk, *Proceedings of IEEE Industry Applications Society Annual Meeting,* Toronto, Canada, Oct. 1–5, 1978.

The Cuk apparatus utilizes a pair of tightly coupled windings wherein the inductances may be adjusted either to cause the output current to be ripple free or to cause the input current to be ripple free. Typically the Cuk apparatus has the two closely coupled windings in series connection with an energy transfer capacitor between them. The two sides of the capacitor are alternately grounded, and the careful adjustment of inductance values and coupling coefficient causes the current through the load or the input current to be substantially ripple free.

This invention, as described herein, is an improvement over our copending patent application which, in turn, was an improvement over the Cuk apparatus described above. The copending patent application of which this is a continuation replaced the single series capacitor of Cuk with two series capacitors and connected the junction between the capacitors through two parallel inductors to ground. Through this arrangement, it was possible to provide both input and output terminals with substantially ripple free currents. The Cuk apparatus was capable of providing a ripple free current only at the input or output terminals but not both.

The present invention carries our copending patent application one step further. That is, the present invention retains the ability of obtaining both input and output currents that are substantially ripple free but accomplishes this same result with fewer components. The present invention retains the serially-connected capacitors in place of the single Cuk capacitor. However, in place of the two parallel inductors connected to ground taught by our copending application, the present invention utilizes but a single inductor connected to ground.

Therefore, it is an object of the present invention to accomplish the same function as the prior art with fewer components.

Another object of the present invention is to provide an optimum topology converter having a no ripple current in either of the input and output circuits.

BRIEF DESCRIPTION OF THE DRAWINGS

Other objects of the present invention will become apparent to those skilled in the art after consideration of the following specification and accompanying drawings, in which.

DETAILS OF THE PREFERRED EMBODIMENT

Figure 1:
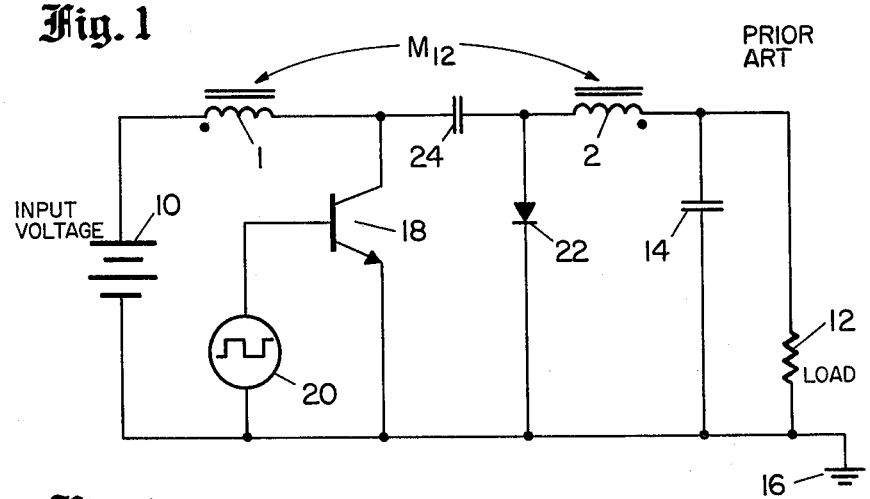
FIG. 1 is a schematic diagram of a prior art circuit.

A typical prior art apparatus according to S. Cuk is shown in FIG. 1. The circuit may be adjusted either to reduce the ripple current in the output circuit to zero or to reduce the ripple current in the input circuit to zero, but it may not be adjusted to reduce the ripple current to zero simultaneously in both the input and output circuits.

The input voltage source 10 is connected in series with the winding 1 of a ferromagnetic core transformer. The winding 1 is magnetically coupled to a second winding 2, see $M_{12}$, which is connected in series with the load 12. An optional smoothing condenser 14 may be connected across the load 12. The inductor 1 is shunted to the ground or common terminal 16 through the emitter-collector path of a transistor 18 whose conductance is controlled by a rectangular wave source 20 between the base of transistor 18 and the common terminal 16. The inductor 2 is shunted through the diode 22 to the common terminal 16. A coupling capacitor 24 is connected for energy transfer between the inductors 1 and 2.

When the transistor 18 is conducting, current flows from the input source 10 through the inductor winding 1 and the transistor 18 to the common terminal 16. The junction between capacitor 24 and winding 1 is substantially at the common terminal potential. When the transistor 18 opens, the anode of diode 22 becomes positive, and current flows through inductor 1, capacitor 24 and diode 22 charging capacitor 24. The junction between capacitor 24 and inductor 2 is substantially at the potential of the common terminal 16. Load current flows through inductor 2 and diode 22.

When transistor 18 again conducts to connect the junction of indicator 1 and capacitor 24 substantially to the potential of common terminal 16, the anode of diode 22 becomes negative relative to the common terminal 16, and diode 22 stops conducting. The negative voltage at the anode of diode 22 causes current to flow in the load 12, through inductor 2, through the condenser 24 and transistor 18 discharging capacitor 24. By specifying the turn ratio of the inductors 1 and 2 as well as the coefficient of coupling, either the input or output current ripple may be reduced to zero.

According to FIG. 5 on page 3 of the article "Switching DC-to-DC Converter With Zero Input or Output Current Ripple" by Slobodan Cuk, supra., which is the same as FIG. 1 herein, when the coefficient of coupling between the inductors 1 and 2 equals the turn ratio between those inductors, the ripple in the output current becomes zero. When the coefficient of coupling between the inductors 1 and 2 equals the reciprocal of the turn ratio between those inductors, the input current ripple becomes zero.

Figure 2:
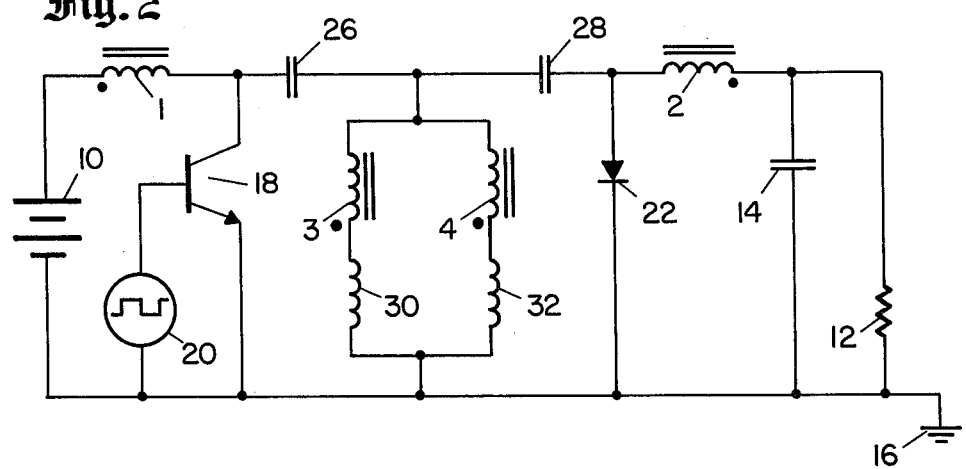
FIG. 2 is a schematic diagram of the circuit found within our copending patent application for which this invention is a continuation-in-part.

In FIG. 2, the capacitor 24 of FIG. 1 has been replaced by two series connected capacitors 26 and 28. Two parallel inductors 3 and 4 connect the center tap between capacitors 26 and 28 to the common terminal 16. The two parallel inductors 3 and 4 are coupled to the other inductors 1 and 2. A pair of uncoupled trimming inductors 30 and 32 are connected in series with the coupled inductors 3 and 4.

In the preferred embodiment of the invention of the copending application, shown in FIG. 2 and discussed in that copending application from which this invention is a continuation-in-part, windings 1, 2, 3 and 4 are wound on the same ferromagnetic core and are thus tightly coupled. In FIG. 2, both the input current and the output current ripple are reduced to zero since the tight coupling between the windings 1, 2, 3 and 4 produce, by induction, cancelling voltages across the inductors thereby allowing changes in current to be zero.

Figure 3:
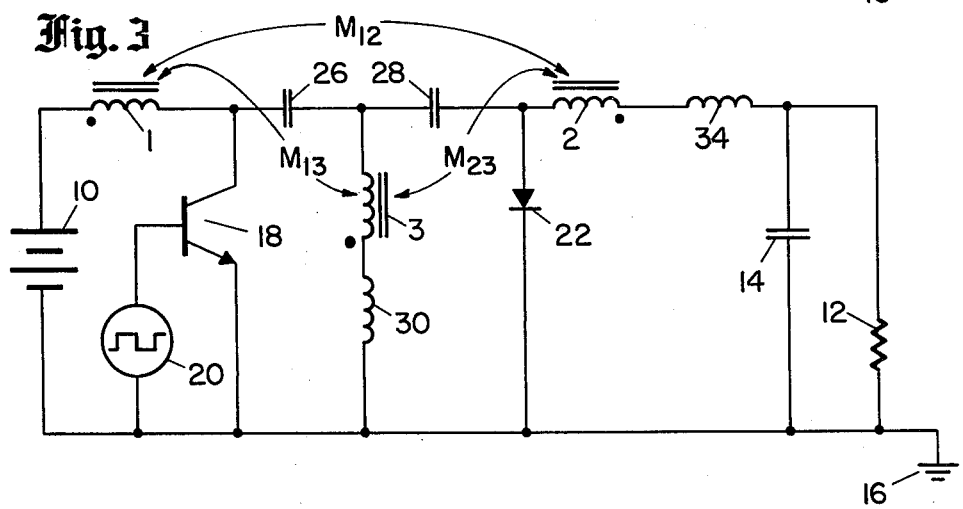
FIG. 3 is a schematic diagram of a preferred embodiment of this invention.

Referring now to FIG. 3, the preferred embodiment of the present invention is shown, wherein the coupled inductors 3 and 4 have been replaced with but a single inductor 3 having a trimming inductor 30 connected between the junction of capacitors 26 and 28 and the common terminal 16. The circuit of FIG. 3 is substantially the same as the circuit of FIG. 2 but for the elimination of the closely coupled inductor 4 and the trimming inductor 32. However, a third small inductor 34 has been added between inductor 2 and the load 12. As in FIGS. 1 and 2, an optional smoothing capacitor 14 may be connected across the load 12.

In FIG. 3 both the input current and output current ripple is reduced to zero if the following conditions relating to coupling coefficients are met:

$$K_1 = K_2 = K_3 \simeq 1, \quad (1)$$

where $$K_1 = \frac{M_{12}}{\sqrt{L_{01}L_{02}}} \quad (2)$$

$$K_2 = \frac{M_{13}}{\sqrt{L_{01}L_{03}}} \quad (3)$$

$$K_3 = \frac{M_{23}}{\sqrt{L_{02}L_{03}}} \quad (4)$$

$$\frac{L_{02}}{L_{01}} = 1 \quad (5)$$

$$l_1 = \sqrt{L_{01}L_{03}} - L_{03} \quad (6)$$

$$l_2 > 0 \quad (7)$$

$M_{12}$ = Mutual inductance between inductors 1 and 2
$M_{13}$ = Mutual inductance between inductors 1 and 3
$M_{23}$ = Mutual inductance between inductors 2 and 3
$L_{01}$ = self inductance of inductor 1
$L_{02}$ = self inductance of inductor 2
$L_{03}$ = self inductance of inductor 3
$l_1$ = self inductance of inductor 30
$l_2$ = self inductance of inductor 34

From the foregoing mathematics with reference to the circuit of FIG. 3, it will become clear that the input and output currents will be ripple free but for imperfections in the components. For example, the foregoing assumes that the switching devices have a rise and fall time of zero nanoseconds. Such imperfections caused by the switching devices, may not be removed by the circuit of the present invention. It is for this reason that the optional smoothing capacitor 14 is still used across the load 12.

While the elimination of the coupled inductor 4 and uncoupled trimming inductor 32 has been accomplished, it will be noted that an additional inductor 34 is required. However, it has been determined, after calculations, that inductor 34, while its value is small, must have a value other than zero. In the experimental circuit, the inductance of inductor 1 and inductor 2 were established at an equal value of 193 microhenries, satisfying equation 5, and the inductance of inductor 3 was arbitrarily established at a value of 97 microhenries. The inductance of inductor 30 was set equal to 40 microhenries, close to the calculated value of 39.8 microhenries obtained from equation 6.

The transistor 18 is shown as an NPN type transistor. It will be understood that any kind of switching element which operates rapidly enough to follow the square wave input of supply 20 may be utilized. For example, the NPN transistor may be replaced with an FET type transistor, a silicon-controlled rectifier or a mechanical switch, vacuum tube or gas tube. The diode may also be replaced with a suitable switch such as a PNP or an NPN transistor. The switching circuit would need modification for such a replacement, however.

Since the DC biases in the inductors are additive, the core windings of inductors 1, 2 and 3 are selected to prevent saturation of the ferromagnetic material. In the preferred embodiment, a ferrite core might be used.

The circuit described in the foregoing specification comes very close to being a DC transformer. Although the invention has been described above with particular values assigned to the inductors, it will be understood by those skilled in the art that other values and further modifications and variations are possible; and that the present invention should be limited only by the accompanying claims.

We claim:

1. In a DC-to-DC converter having first input terminals for receiving a DC source and second output terminals for connecting a load thereto, said input and output terminals having a common terminal and inductively coupled and capacitively coupled together, first switching apparatus connected in a closed mode to deliver input current from said input terminals through a first inductor, second switching apparatus connected in a closed mode to deliver output current through a second inductor to said output terminals, apparatus for cycling said switching apparatus so that one is open when the other is closed, said capacitive coupling comprising a pair of capacitors in series connection, third inductor means connected to the junction between said capacitors and inductively coupled to said first and second inductors, the improvement comprising:

a fourth inductor substantially uncoupled from said first, second and third inductors, connected in series between said third inductor and said common terminal.

2. Apparatus as claimed in claim 1 and additionally comprising:

a fifth inductor substantially uncoupled from said first, second and third inductors, serially connected between said second inductor and said load.

3. Apparatus, as claimed in claim 2, wherein said second substantially uncoupled inductor may have any value of inductance greater than zero.

* * * * *